United States Patent
Vivaracho Rodriguez et al.

(10) Patent No.: US 12,404,005 B2
(45) Date of Patent: Sep. 2, 2025

(54) REINFORCED LEADING EDGE SECTION FOR AN AIRCRAFT

(71) Applicant: Airbus Operations S.L., Getafe (ES)

(72) Inventors: Rubén Vivaracho Rodriguez, Getafe (ES); Gonzalo Ramirez Blanco, Getafe (ES)

(73) Assignee: Airbus Operations S.L., Getafe (ES)

( * ) Notice: Subject to any disclaimer, the term of this patent is extended or adjusted under 35 U.S.C. 154(b) by 14 days.

(21) Appl. No.: 17/874,604

(22) Filed: Jul. 27, 2022

(65) Prior Publication Data

US 2023/0031989 A1    Feb. 2, 2023

(30) Foreign Application Priority Data

Jul. 29, 2021  (EP) ..................................... 21382712

(51) Int. Cl.
*B64C 3/28*    (2006.01)
*B64C 3/26*    (2006.01)

(52) U.S. Cl.
CPC . *B64C 3/28* (2013.01); *B64C 3/26* (2013.01)

(58) Field of Classification Search
CPC .................................. B64C 3/26; B64C 3/185
See application file for complete search history.

(56) References Cited

U.S. PATENT DOCUMENTS

| | | | | |
|---|---|---|---|---|
| 2,013,323 A | * | 9/1935 | Waner | ........................ B64C 3/26 244/121 |
| 2007/0138340 A1 | * | 6/2007 | Arafat | ........................ B64C 3/28 244/121 |
| 2008/0258009 A1 | | 10/2008 | Alvarez | |
| 2014/0133987 A1 | * | 5/2014 | Guinaldo Fernandez | ................... F01D 5/14 29/889.7 |

FOREIGN PATENT DOCUMENTS

| | | |
|---|---|---|
| EP | 2687436 A1 | 1/2014 |
| WO | 2005030577 A1 | 4/2005 |
| WO | 2008119664 A2 | 10/2008 |
| WO | 2014094549 A1 | 6/2014 |

OTHER PUBLICATIONS

European Search Report; priority document.

* cited by examiner

*Primary Examiner* — Nicholas McFall
*Assistant Examiner* — Eric Acosta
(74) *Attorney, Agent, or Firm* — Greer, Burns & Crain, Ltd.

(57) ABSTRACT

A reinforced leading edge section for an aircraft, including an outer skin formed with an aerodynamic leading edge profile, an inner reinforcement arranged internally with respect to the outer skin along the span of the leading edge section, wherein the inner reinforcement includes a base with a C-shaped configuration joined to the outermost part of the outer skin, and a web having a free end and an opposite end joined to the base, the web extended in a direction transverse to the direction of the span of the leading edge section.

8 Claims, 2 Drawing Sheets

REINFORCED LEADING EDGE SECTION FOR AN AIRCRAFT

CROSS-REFERENCES TO RELATED APPLICATIONS

This application claims the benefit of the European patent application No. 21382712.4 filed on Jul. 29, 2021, the entire disclosures of which are incorporated herein by way of reference.

FIELD OF THE INVENTION

The present invention relates to a leading edge configuration for an aircraft.

BACKGROUND OF THE INVENTION

Bird strike collisions during flight, take-off and landing happen every day, jeopardizing people and aircraft integrity.

Certification regulations governing certain categories of aircraft require that, in the event of damage to a component caused by collision with a bird, the aircraft has to be capable of maintaining flight long enough to reach a landing site. For that, conventional aircraft lifting surfaces are configured to both withstand the bird strikes and fulfilling the aerodynamic requirements. The integration of these both functionalities results in a secured, but heavy design of the leading edges of the aircraft that ensure that there is no affectation of the primary structure allocated behind the leading edges.

Nowadays, aircraft aerodynamic surfaces, such as wings or stabilizers (a Horizontal Tail Plane (HTP) or a Vertical Tail Plane (VTP)), comprises leading edges 30 with increasing thickness in order to reach the maximum value in their outermost parts (the so-called D nose), which is the critical area from the impact point of view.

FIG. 1 shows a state of the art aircraft aerodynamic surface having a leading edge 6, a trailing edge 7 and several spars 8 in-between. As shown, the leading edge 6 comprises several composite plies 9 laid up to engross the leading edge 6 area, resulting in a heavy part.

Therefore, it would be desirable to provide a new leading edge that reduces the weight and cost of traditional leading edge sections.

SUMMARY OF THE INVENTION

The present invention overcomes the above mentioned drawbacks by providing a leading edge section for an aircraft with a reduction in weight and cost.

An object of the present invention is to provide a leading edge section for an aircraft that minimizes the weight and cost required in its manufacturing, at the same time that withstands a bird strike event.

Another object of the present invention is to provide a leading edge section for an aircraft that is compatible with any manufacturing material.

The present invention refers to a reinforced leading edge section for an aircraft that comprises an outer skin formed with an aerodynamic leading edge profile, and an inner reinforcement arranged internally with respect to the outer skin along the span of the leading edge section. The inner reinforcement comprises a base with a C-shaped configuration joined to the outermost part of the outer skin, and a web having a free end and an opposite end joined to the base. The web is extended in a direction transverse to the direction of the span of the leading edge section.

This way, the invention provides a new section with a more resistive structure (mass) incorporated in the forward area of the leading edge, resulting in a section capable of absorbing more energy from a bird impact.

The new leading edge section offers a part with reduced weight and manufacturing cost due to the simplification of the design. The thickness changes in the leading edge will be avoided by adding an inner reinforcement along the D nose forward area. In addition, this configuration increases the inertia for the critical impact direction, adding the reinforcement just in the most important area.

BRIEF DESCRIPTION OF THE DRAWINGS

For a better comprehension of the invention, the following drawings are provided for illustrative and non-limiting purposes, wherein.

DETAILED DESCRIPTION OF THE PREFERRED EMBODIMENTS

Figure 1:
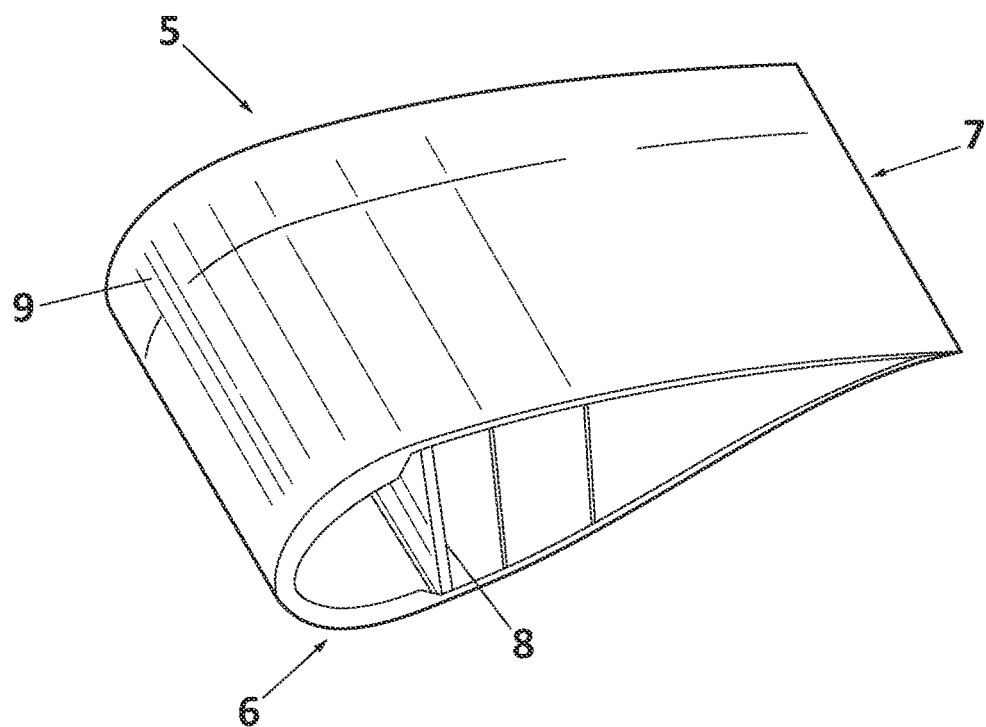
FIG. 1 shows a schematic view of a state of the art leading edge provided with a thickening in its outermost area.
Figure 2:
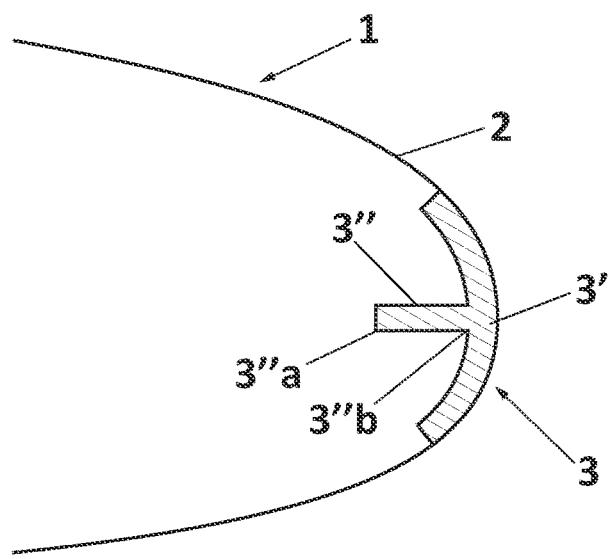
FIG. 2 shows a schematic view of a leading edge section, according to a first embodiment of the present invention.

FIG. 2 shows a reinforced leading edge section (1) for an aircraft that comprises an outer skin (2) and an inner reinforcement (3). The outer skin (2) is formed with an aerodynamic leading edge profile. The inner reinforcement (3) is arranged internally with respect to the outer skin (2) along the span of the leading edge section (1).

As shown in FIG. 2, the inner reinforcement (3) comprises a base (3'), and a web (3") with a free end (3"a) and an opposite end (3"b) joined to the base (3'). The base (3') has a C-shaped configuration and it is joined to the outermost part of the outer skin (2). The web (3") is extended in a direction transverse to the direction of the span of the leading edge section (1).

This way, the invention provides a leading edge section with an improved impact behavior, a reduced weight, and easier manufacture due to the avoidance of thickness changes.

Figure 3:
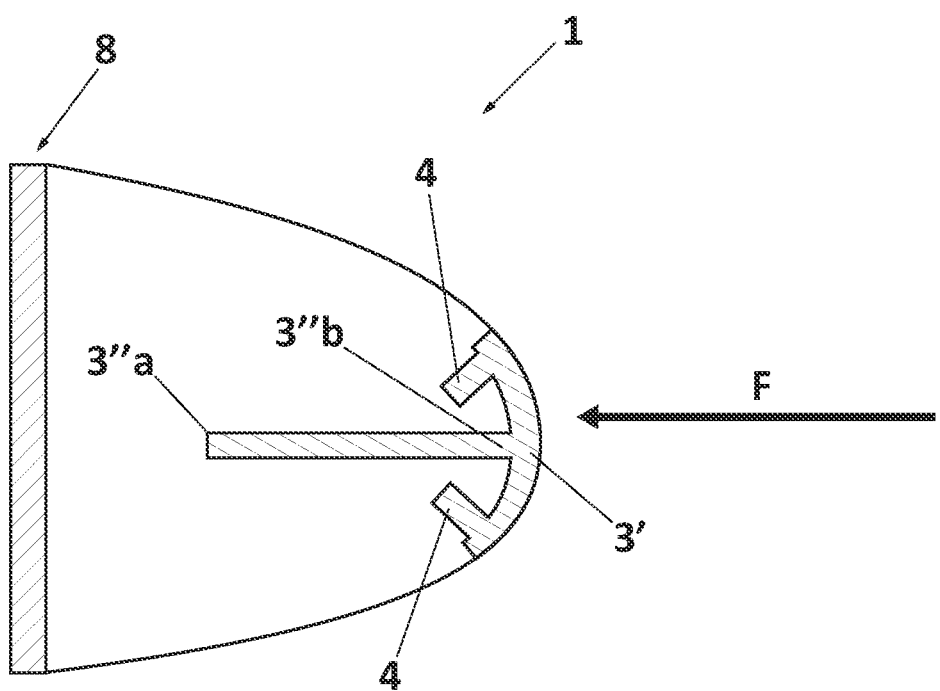
FIG. 3 shows a schematic view of a leading edge section, according to a second embodiment of the present invention.

As shown in FIG. 3 and according to another preferred embodiment, the reinforced leading edge section (1) further comprises one pair of secondary reinforcements (4) attached to, or integral with, both ends of the base (3') of the inner reinforcement (3) to maximize the forward mass. As shown, the secondary reinforcements (4) are preferably radially extended towards the free end of the web (3"a).

As in FIG. 2, the web (3") of the inner reinforcement (3) is extended towards the rear part, the leaving a marginal distance to avoid any contact of the inner reinforcement (3) with the front spar (8) in the event of a bird strike.

According to another preferred embodiment, the thickness and/or height of the inner reinforcement (3) is at least twice the radius of the leading edge section (1).

According to another preferred embodiment, the thickness of the base (3') of the inner reinforcement (3) is different from the thickness of the web (3") in order to optimize the construction of the part.

According to another preferred embodiment, the inner reinforcement (3) is made of metallic or composite material.

According to another preferred embodiment, the inner reinforcement (3) is attached to the outer skin (2) by riveting or welding when the leading edge section (1) is metallic, or by riveting, cobonding, or cocuring when the leading edge section (1) is of composite material.

Figure 4:
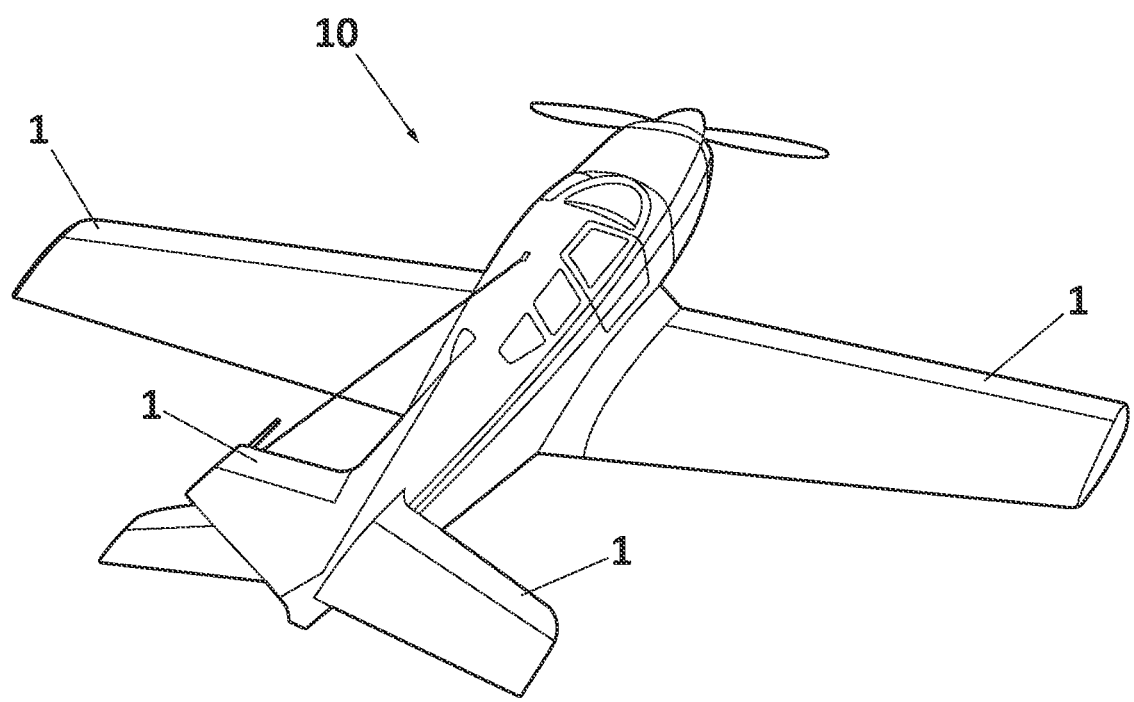
FIG. 4 shows an aircraft equipped with the leading edge section of the invention.

Finally, FIG. 4 shows an aircraft 10 equipped with the leading edge section (1) as described in the wings, the HTPs and the VTP.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A reinforced leading edge section for an aircraft, comprising:
   an outer skin formed with an aerodynamic leading edge profile, and
   an inner reinforcement arranged internally with respect to the outer skin along a span of the leading edge section,
   wherein said inner reinforcement comprises a base with a C-shaped configuration joined to an outermost part of the outer skin, a web having a free end and an opposite end joined to the base, the web extended in a direction transverse to a direction of the span of the leading edge section, and at least one pair of secondary reinforcements integral with both ends of the base of the inner reinforcement,
   wherein the secondary reinforcements are proximate to terminal edges of each of the ends of the base of the inner reinforcement,
   wherein the inner reinforcement is fabricated as a single component, and
   wherein the free end of the web extends beyond the base a distance at least twice as large as a radius of curvature of the base.

2. The reinforced leading edge section for an aircraft, according to claim 1, wherein the secondary reinforcements are radially extended towards the free end of the web.

3. The reinforced leading edge section for an aircraft, according to claim 1, wherein at least one of a thickness or height of the inner reinforcement is at least twice a radius of the leading edge section.

4. The reinforced leading edge section for an aircraft, according to claim 1, wherein a thickness of the base of the inner reinforcement is different from a thickness of the web.

5. The reinforced leading edge section for an aircraft, according to claim 1, wherein the inner reinforcement is made of metallic or composite material.

6. The reinforced leading edge section for an aircraft, according to claim 1, wherein the inner reinforcement is attached to the outer skin by riveting or welding when the leading edge section is metallic, or by riveting, cobonding, or cocuring when the leading edge section is made of composite material.

7. The reinforced leading edge section for an aircraft, according to claim 1, wherein a thickness of the base decreases between where the web joins the base and both of the terminal edges of the ends of the base.

8. The reinforced leading edge section for an aircraft, according to claim 1, wherein a length of the secondary reinforcements is at least twice as large as a thickness of the base.

* * * * *